(12) United States Patent
Wade

(10) Patent No.: US 7,693,723 B2
(45) Date of Patent: Apr. 6, 2010

(54) METHOD AND SYSTEM FOR CROSS-CARRIER PARCEL TRACKING

(75) Inventor: James P. Wade, North Potomac, MD (US)

(73) Assignee: United States Postal Service, Washington, DC (US)

( * ) Notice: Subject to any disclaimer, the term of this patent is extended or adjusted under 35 U.S.C. 154(b) by 1531 days.

(21) Appl. No.: 10/166,491

(22) Filed: Jun. 10, 2002

(65) Prior Publication Data

US 2003/0009351 A1 Jan. 9, 2003

Related U.S. Application Data

(60) Provisional application No. 60/296,448, filed on Jun. 8, 2001.

(51) Int. Cl.
G06Q 99/00 (2006.01)
G06Q 10/00 (2006.01)
(52) U.S. Cl. .............................................. 705/1; 705/5
(58) Field of Classification Search ...................... 705/1, 705/5
See application file for complete search history.

(56) References Cited

U.S. PATENT DOCUMENTS

| | | | |
|---|---|---|---|
| 5,715,164 A | 2/1998 | Liechti et al. | |
| 6,032,138 A | 2/2000 | McFiggans et al. | |
| 6,513,045 B1 * | 1/2003 | Casey et al. | 707/104.1 |
| 6,988,079 B1 * | 1/2006 | Or-Bach et al. | 705/28 |
| 2002/0032573 A1 * | 3/2002 | Williams et al. | 705/1 |
| 2002/0123911 A1 * | 9/2002 | Bjerre et al. | 705/5 |
| 2003/0023695 A1 * | 1/2003 | Kobata et al. | 709/206 |
| 2005/0197892 A1 * | 9/2005 | Bilibin et al. | 705/13 |

OTHER PUBLICATIONS

US Postal Service's reclassification system to Hatch Denny, Target Marketing, v19, n11, p. 22 (8), Nov. 1996.*

* cited by examiner

Primary Examiner—Matthew S. Gart
Assistant Examiner—Garcia Ade
(74) Attorney, Agent, or Firm—Lewis and Roca LLP

(57) ABSTRACT

A system and method is provided that enables a carrier of a mailpiece, such as a national postal service, to track a mailpiece as it passes from the control of a first carrier to the control of another, second carrier. The tracking of the mailpiece continues until the mailpiece is delivered, by the second carrier, to its ultimate recipient. In this manner the first carrier, who had control of the mailpiece when first posted, can monitor the handling of the mailpiece and can calculate delivery times when the mailpiece was in the control of the second carrier. The method and system of the present invention will find particular application to a national postal service seeking to track delivery performance of internationally addressed express mail that is first domestically posted and then ultimately delivered in a foreign country by the postal service of the foreign country.

5 Claims, 2 Drawing Sheets

METHOD AND SYSTEM FOR CROSS-CARRIER PARCEL TRACKING

CROSS-REFERENCE TO RELATED APPLICATIONS

This application claims priority from U.S. Provisional Application No. 60/296,448 filed on Jun. 8, 2001, entitled "Method and System for Cross-Carrier Parcel Delivery." The contents of the above provisional application is relied upon and expressly incorporated by reference as if fully set forth herein.

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

The invention relates generally to a method and system for providing cross-carrier tracking and accountability techniques. More particularly the invention relates to marking passage of a mailpiece from the control of one carrier of the mailpiece to the control of another carrier. The technique to record the passage of control may be accomplished through methods such as bar code scanning or optical character recognition techniques. The invention allows mailpieces to be time-tracked, and provides financial incentives to postal administrations to meet target delivery dates.

2. Description of the Related Art

Currently, if an express parcel is shipped from the United States to a foreign country via the USPS, the USPS loses control of the parcel once it leaves U.S. soil. This makes it difficult for the USPS to guarantee delivery within a specified time frame. The same problem exists in any situation in which delivery of a mailpiece is started by one entity and completed by a second entity. The first entity must have the cooperation of the second entity in order to track, manage, and monitor delivery performance by the second entity. In this same manner, foreign countries also face similar constraints with cross-border shipping into the United States. Foreign entities thus also seek methods by which to monitor and improve their express mail deliveries into the US.

Companies such as UPS and Federal Express do not operate with this disadvantage since they control the parcel door-to-door. As a result, the market sometimes perceives a benefit to transmitting overseas express parcels through carriers other than the USPS.

This invention is intended to level the playing field by introducing cross-border tracking and accountability techniques. The invention allows all parcels to be time-tracked, and provides financial incentives to national postal administrations to meet target delivery dates.

For example the USPS currently pays foreign postal administrations for delivering Express Mail without taking into account whether or not the product met service performance standards. In addition foreign postal administrations reimburse the USPS for delivering Express Mail without regard for service performance.

Accordingly, there is a need for a system and method that allows a mail service to improve the delivery of express mail for international destinations. It is desirable to provide a method that obtains these advantages without requiring investment in expensive or costly machinery.

SUMMARY OF THE INVENTION

It is an object of the present invention to provide a system and method for tracking mail that is delivered by two entities. The present invention has particular application to express mail, that is mail to be delivered on an expedited basis. When express mail is sent that has an international delivery, the national postal services of two countries will be involved. The present system provides advantages that the two countries can follow in delivering such mail.

It is a further object of the present invention to provide incentive methods for international express mail delivery. The incentive methods include tracking mail as it proceeds on the course of delivery. The compensation that is paid to the postal service in the delivering country is tied to the speed at which delivery takes place. For example, a higher compensation is paid when a higher percentage of express mail is delivered within a certain time period. This form of compensation motivates the delivering country to deliver express mail promptly.

An additional object of the present invention is that it provides a system and method whereby delivery services can mutually track deliveries of express mail. Where for instance one country sends its own express mail to a second country, while at the same time delivering the other country's express mail in its own country, both countries can implement the present invention. The method allows the two countries to track their own delivery performance and the other's delivery performance. Based upon certain criteria, the two countries can calculate offsets for compensation.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claim. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
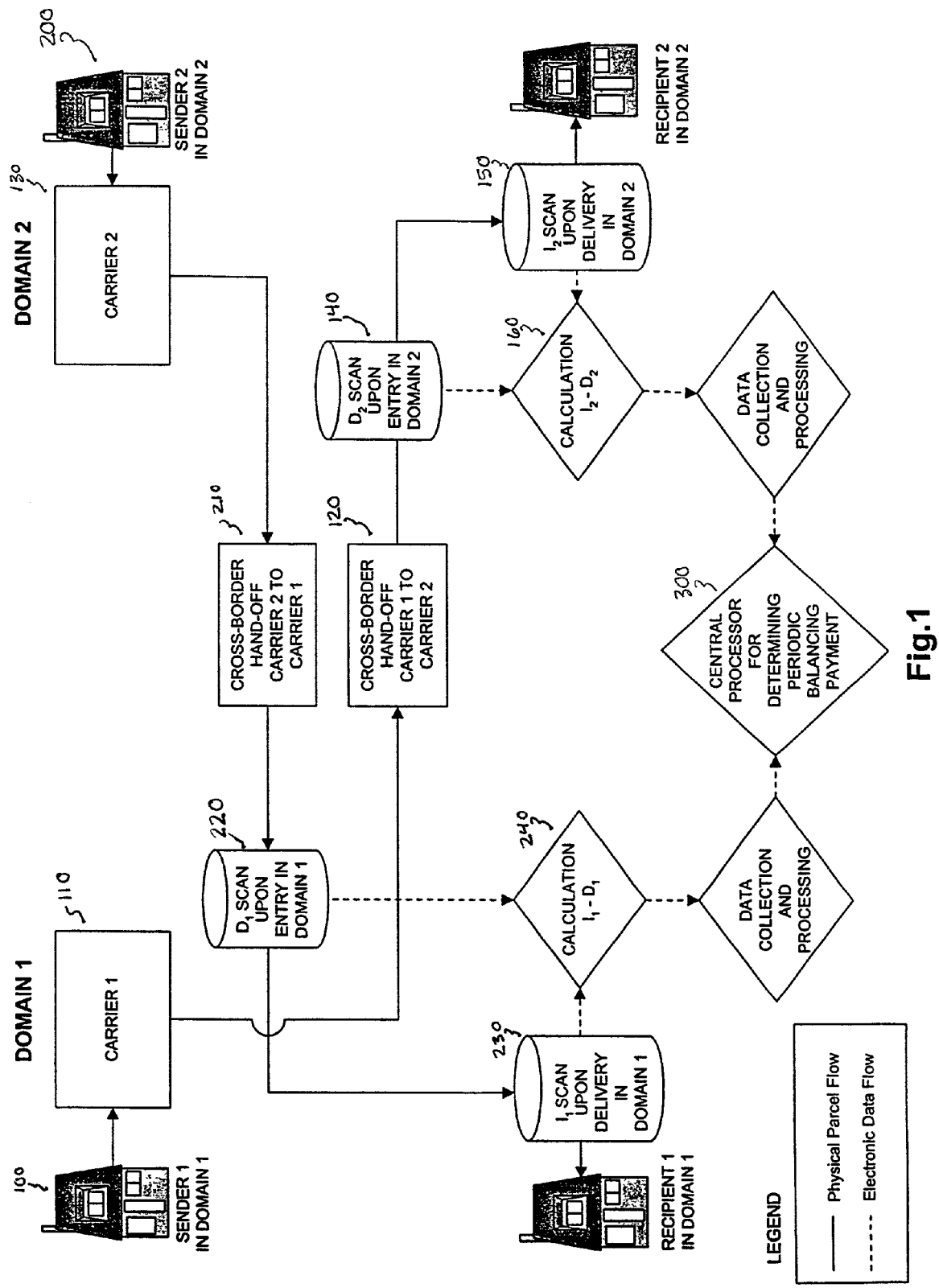
FIG. 1 is a schematic showing the cross-carrier parcel tracking system of the present invention.

Referring initially to FIG. 1 there is shown a schematic of the present invention. The invention may be applied to inter-country or intra-country shipping scenarios depending on the circumstances. For purposes of example only, the invention is discussed below in connection with inter-country express mail deliveries between the United States Postal Service (USPS) and the postal services of countries such as Japan, Korea, Singapore, Hong Kong, China, Australia, New Zealand, and Great Britain. In this example, the term "parcel" refers to an express mailpiece. However, in its broadest sense, the invention is not so limited. The invention can be used in connection with any mailpiece, package, or other item conventionally carried by public carriers such as the USPS, or private carriers such as Federal Express or United Parcel Service. In addition, the invention may be used by cooperating freight or moving companies who work together to transport consumer goods, furniture, vehicles, or other items that require transportation.

Once an express parcel enters the destination country, a time is recorded. A second time is recorded when the parcel is delivered to the intended recipient and an elapsed time "in-country" is computed. If the parcel has to go through customs, any customs delay may be deducted. The elapsed time in-country may determine how much the postal administration in the destination country is paid by the postal administration in the country of the parcel's origin. For example, the system might be configured to compare the elapsed time in-country with a performance standard. If the elapsed time in-country exceeds the performance standard, the postal administration in the country in which the parcel was delivered may be penalized by receiving a reduced delivery fee from the postal administration in the country of the parcel's origin.

There will be specific performance standards that will likely differ for each country as a function of each country's demographics and geography. In Singapore and Hong Kong, for example, the urban delivery areas are not very big. However, China has extremely large urban delivery areas. Thus, the performance standards for some Chinese cities may allow more time for delivery than for cities in Singapore and Hong Kong.

Specific performance standards and penalties for each country have yet to be developed. However, as an example, the standard delivery time for a parcel entering the United States may be 3 days from the date the parcel reaches U.S. soil and clears customs. If 90 percent of mailpieces are delivered within 3 days in-country, the USPS may receive 100 percent of the USPS delivery charges from the postal service of the originating foreign country. If, however, only 70 percent are delivered within the time standard, the USPS may only receive 80 percent of USPS's delivery charges. As a result if a participating country does not adopt proper controls, penalties may prevent them from covering its delivery costs.

The delivery data gathered in the U.S. might be fed through the MIDAS system, which is a military and international dispatch accountability system. That system will collect data on each item. As each item comes into the country, the item is scanned. The scanned data goes through MIDAS, then through a database and eventually, ends up in another database called GEIS in Belgium. The International Post Corporation (IPC) in Belgium collects all that data. It also collects data from other countries worldwide. IPC is developing a table that will enable countries to determine if delivery times are met. This, in turn, will enable penalties to be charged to countries who do not meet performance standards.

Various countries may have their own internal data gathering system to send information to the International Post Corporation's GEIS database. Each mailpiece might be assigned a unique identifier code that will stay with the piece throughout the entire process. So if the GEIS database says that piece X is delivered in the U.S., a computer look-up at the USPS using the same identification code might confirm the delivery. Similarly, the country of origin may access their system and look up the same piece X.

In terms of cooperation between countries, each country pre-advises others on the number of bags and containers of mail headed their way. Manifests allow the USPS to keep track of the identity of each mailpiece in each bag and container when they leave this country. The same is true for foreign countries. So the USPS knows, for example, that on Jun. 1, 0XX, it will receive 16 bags from Hong Kong on United flight 01.

Participating countries may scan the mail upon entry and upon delivery. Alternatively, they can avoid the entry scan by relying on bag/container content data provide by the originating country. This may be accomplished, for example, if each country sends and receives PREDES 2 and RESDES messages. These are messages available on current shipping packages. They provide a pre-advice of items that will be shipped to a foreign country from a shipping country. They also provide a return communication from a receiving country to the shipping country stating the identity of items actually received, and any items on the pre-advice that were not received.

Each individual letter carrier in the United States has a scanner, and preferably, cooperating countries will provide the same to their letter carriers. Each letter carrier might then scan a delivery item upon delivery or upon an attempted delivery. Once a delivery is attempted, the delivery postal service will receive credit as if the parcel had been delivered. In some instances, scanned data may be transferred instantaneously to a central database. In others, transfer may occur within 24 hours. Preferably the exporting and importing country will relay scanning data within a specified time.

By incentivizing timely delivery, national postal services can guarantee crossborder delivery time, increasing reliability and thereby improving market share.

Technology may be used to ensure that scans are captured accurately and are transmitted within a timely manner. That technology might also ensure that each country transmits the data within hours of capturing it. This will enable countries to track their own, and perhaps each other's performance in real time. Using this technology, it may be possible to log on the system on Monday and see a bird's eye overview of a previous week's performance for each participating country. The USPS might learn, for example, that in the previous week, it met performance standards 90 percent of the time, while Country Z only met performance standards 50 percent of the time. This will allow the USPS to quickly determine whether Country Z will get paid or whether Country Z will have to make a balancing payment to the USPS.

The invention will now be described in connection with attached FIG. 1. For ease of discussion, FIG. 1 illustrates two domains. However, the invention can be used in connection with many more than two domains. Depending on how the invention is implemented, each domain may be a separate country, a separate region within a country, the territory of a public or private carrier, or a carrier's customer base (which could overlap with other carrier's customer bases). As illustrated in the upper left-hand corner of FIG. 1, a sender 100 in Domain 1 transmits a parcel using a Carrier 1 110 associated with Domain 1. Most likely, the Carrier 1 will scan the parcel upon receipt from the sender and upon passing-off 120 the parcel to Carrier 2 130. However, for ease of discussion, scans by the originating carrier are not illustrated in FIG. 1.

Carrier 1 hands-off the parcel 120 to Carrier 2 (e.g., by shipping it via air, delivering it by truck, etc.). When the parcel is received by Carrier 2, the parcel receives a D2 scan 140. The scan may be accomplished by physically scanning each parcel in a container received from the originating carrier, or more likely by entering a container or bag code into a system linked to data already collected by Carrier 1 regarding the contents of the container/bag (PREDES 2 information).

When Carrier 2 delivers the parcel to the recipient in Domain 2, the parcel receives an I2 scan 150. The D2 scan and the I2 scan are electronically transmitted to a processor which performs a subtraction 160 to determine the elapsed in-country delivery time. That elapsed time data is collected and compiled with other Domain 2 delivery data.

Similarly, a sender 200 in Domain 2 uses a Carrier 2 to initially transmit a parcel destined for Domain 1. Carrier 2 passes-off 210 the parcel to Carrier 1 at which point a D1 220 time scan is taken in a manner similar to the D2 scan described above. Upon delivery to Recipient 1 in Domain 1, an I2 230 time scan is taken. The I1 and D1 time scans are subtracted 240 to determine an elapsed delivery time, and that elapsed time is collected with other elapsed time data for Carrier 1. While, for ease of discussion, the description refers to "I scans," it is contemplated that elapsed delivery time could also be based on either an I scan (delivery) or an H scan (attempted delivery).

The elapsed time data of Carrier 1 and Carrier 2 are then sent to a central processor which processes the data in accordance with a set of rules, thereby determining a periodic balancing payment 300. Alternatively, the processor could simply calculate a penalty for each country to pay.

By way of a simplified example, assume each of two carriers receives from the other one hundred packages to deliver, and each carrier has a three-day delivery performance standard. If the first carrier delivers 80% percent of the packages within the standard, and the second carrier delivers 50% of the parcels within the standard, the second carrier will owe the first a balancing payment providing the agreed upon delivery charges are the same. If delivery charges are not the same between Carrier 1 and Carrier 2, calculations may be made to determine which country receives the balancing payment.

In its broadest sense, the invention may include systems that employ a one way performance incentive. For example, a first carrier may contract with a second carrier to deliver a parcel originating with the first carrier. The amount of payment to the second carrier may be a function of the second carrier's performance. The second carrier, for example, may receive a reduced payment for parcels not delivered (or where delivery is not attempted) within a predetermined time frame.

The performance criteria act as an incentive to encourage a delivery service to promptly deliver foreign-originated express mail. Presently, there has been no such incentive. By tying compensation to performance, the present system improves delivery of express mail in foreign jurisdictions.

Figure 2:
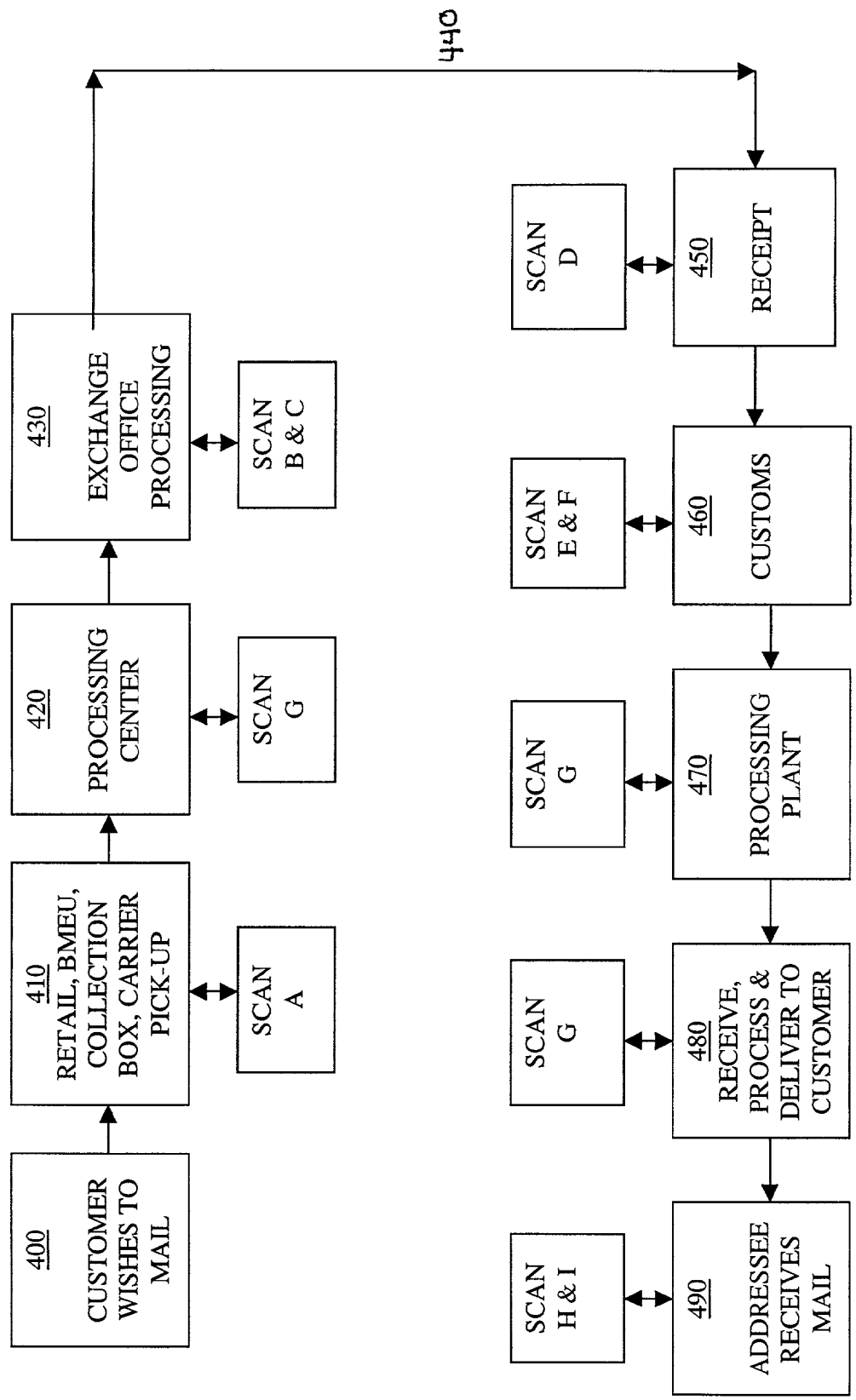
FIG. 2 is a flow chart showing tracking steps involved in the method of the present invention.

Referring now to FIG. 2 there is shown a flowchart with scanning points now in place. By availing itself of this existing framework, the present invention minimizes any need for scanning hardware or procedures. Scanning hardware is already in place. The fault it is in the failure of policy to tie performance and compensation.

FIG. 2 tracks processing of a mailpiece on an international delivery. The process begins with step 400 when a customer mails a mailpiece. When received by the delivery service, in step 410, the mailpiece will undergo an acceptance scan, Scan A. The initial data related to the mailpiece is inputted at that point. The mailpiece next passes into a processing center, step 420, where it undergoes Scan G, an enroute processing scan. Next, step 430, the mailpiece embarks from its originating country. At this step the mailpiece undergoes a B Scan and a C Scan. These scans relate to processing in the exchange office and assignment to transportation. Step 440 is international transport. At Step 450, the mailpiece is received by the foreign country. D Scan records receipt of the mail piece at that point. Step 460 relates to the mail piece passing through customs Scans E and F record entry into and out of customs. This information is important to the present invention as time in customs, which is beyond the control of the delivery service, is not included in the calculation of in-country processing time. Step 470 shows the mailpiece being handled at a processing plant. Another G Scan, enroute processing takes place. Step 480 notes the final delivery by the delivery service, the final time the mailpiece is handled by the delivery service. Another Scan G can take place at that point. Finally, in Step 490 the mailpiece is delivered, or delivery is attempted. Scan H corresponds to an attempted delivery. Scan I corresponds to a successful delivery.

The processing and scans of FIG. 2 identify many of the standard procedures that international deliverers and processors follow. Thus the method and system of the present invention adapts easily to this structure.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A computer-implemented method for physically delivering parcels using at least two cooperating carriers, the method comprising:

physically transporting, using a first carrier, a first parcel from a first sender, the first parcel being addressed to a first recipient;

physically transporting using a second carrier, a second parcel from a second sender, the second parcel being addressed to a second recipient;

establishing a first carrier delivery performance standard for the first carrier;

establishing a second carrier delivery performance standard for the second carrier;

establishing a first carrier delivery charge payable by the second carrier to the first carrier when the first carrier meets the first carrier delivery performance standard and enabling computer-implemented payment of the first carrier delivery charge by the second carrier to the first carrier;

establishing a second carrier delivery charge payable by the first carrier to the second carrier when the second carrier meets the second carrier delivery performance standard and enabling computer-implemented payment of the second carrier delivery charge by the first carrier to the second carrier;

handing-off the first parcel from the first carrier to the second carrier;

handing-off the second parcel from the second carrier to the first carrier;

recording, using a computer, a first time keyed to the receipt of the first parcel by the second carrier;

recording, using a computer, a second time keyed to receipt of the second parcel by the first carrier;

physically delivering, via the second carrier, the first parcel to the first recipient;

physically delivering via the first carrier, the second parcel to the second recipient;

recording a third time keyed to delivery of the first parcel to the first recipient;

recording a fourth time keyed to delivery of the second parcel to the second recipient;

using a computer, calculating an elapsed time delivery time for the first parcel by determining the difference between the third time and the first time and thereby determining whether the first carrier met the first carrier delivery performance standard and earned all of the first carrier delivery charge;

using a computer, calculating an elapsed time delivery time for the second parcel by determining the difference between the fourth time and the second time and thereby determining whether the second carrier met the second carrier delivery performance standard and earned all of the second carrier delivery charge;

using a computer, crediting a balancing payment from the second carrier to the first carrier when the elapsed time for delivery of the first parcel exceeds a prescribed performance standard for the second carrier; and using a computer, crediting a balancing payment from the first carrier to the second carrier when the elapsed time for delivery of the second parcel exceeds a prescribed performance standard for the first carrier.

2. The method of claim 1 further including transmitting, within a prescribed time period, data from the first and second carriers to a third party, and wherein the third party determines the extent of any monetary payment credit.

3. The method of claim 2 further including sending messages from the third party to the first and second carriers notifying of any monetary payment due.

4. The method of claim 1 wherein the monetary payment occurs on a periodic basis.

5. The method of claim 1 wherein the monetary payment from a first carrier to a second carrier is offset by any monetary payment due from the second carrier to the first carrier.

* * * * *